United States Patent
Haugen et al.

(10) Patent No.: US 6,482,763 B2
(45) Date of Patent: Nov. 19, 2002

(54) SUBOXIDE FUEL CELL CATALYST FOR ENHANCED REFORMATE TOLERANCE

(75) Inventors: Gregory M. Haugen, Edina; Mark K. Debe, Stillwater; John H. Thomas, III, Grant; Krzysztof A. Lewinski, Oakdale; George D. Vernstrom, Saint Paul, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 102 days.

(21) Appl. No.: 09/745,501

(22) Filed: Dec. 22, 2000

(65) Prior Publication Data

US 2002/0004453 A1 Jan. 10, 2002

Related U.S. Application Data

(60) Provisional application No. 60/173,444, filed on Dec. 29, 1999.

(51) Int. Cl.[7] .................................................. H01M 4/88
(52) U.S. Cl. ....................... 502/101; 502/305; 502/309; 502/311; 502/314; 502/353; 429/40; 429/44; 427/126.3; 427/250; 427/255.3; 427/255.7; 427/419.2; 204/192.11; 204/192.12; 204/191.15; 219/121.6
(58) Field of Search ................................. 502/101, 305, 502/309, 311, 314, 353; 429/40, 44; 204/192.11, 192.12, 192.15; 427/126.3, 250, 255.3, 255.7, 419.2; 219/121.6

(56) References Cited

U.S. PATENT DOCUMENTS

| | | | |
|---|---|---|---|
| 4,127,468 A | * 11/1978 | Alfenaar et al. ............... | 429/40 |
| 4,812,352 A | 3/1989 | Debe ........................... | 428/142 |
| 4,910,099 A | 3/1990 | Gottesfeld .................... | 429/13 |
| 5,039,561 A | 8/1991 | Debe ........................ | 427/255.6 |
| 5,183,713 A | 2/1993 | Kunz .......................... | 429/44 |
| 5,338,430 A | 8/1994 | Parsonage et al. .......... | 204/412 |
| 5,523,177 A | 6/1996 | Kosek et al. ................. | 429/40 |
| 5,876,867 A | * 3/1999 | Itoh et al. .................... | 429/44 |
| 5,879,827 A | 3/1999 | Debe et al. ................... | 429/40 |
| 5,879,828 A | 3/1999 | Debe et al. ................... | 429/40 |

(List continued on next page.)

FOREIGN PATENT DOCUMENTS

WO    WO 00/35037    6/2000

OTHER PUBLICATIONS

Ross, "The Science of Electrocatalysis on Biometallic Surfaces", Lawrence Berkely National Laboratories Report, LBNL–40486.

P. K. Shen and A. C. C. Tseung; "Anodic Oxidation of Methanol on Pt/WO$_3$ in Acidic Media", *Journal of Electrochemical Society*, vol. 141, No. 11, Nov. 1994, pp. 3082–3090.

(List continued on next page.)

*Primary Examiner*—Bruce F. Bell
(74) *Attorney, Agent, or Firm*—Philip Y. Dahl

(57) ABSTRACT

The present invention provides fuel cell electrode catalysts comprising alternating platinum-containing layers and layers containing suboxides of a second metal, where the catalyst demonstrates an early onset of CO oxidation. Preferred second metals are selected from the group consisting of Group IIIb metals, Group IVb metals, Group Vb metals, Group VIb metals and Group VIIb metals, most preferably Ti, Ta, W and Mo. The present invention additionally provides methods of making such catalysts, preferably by alternate deposition of platinum and second metals in the presence of substoichiometric amounts of gaseous oxygen.

45 Claims, 2 Drawing Sheets

U.S. PATENT DOCUMENTS

| | | | |
|---|---|---|---|
| 5,916,702 A | * | 6/1999 | Marucchi-soos et al. ..... 429/44 |
| 5,922,488 A | * | 7/1999 | Marucchi-soos et al. ..... 429/44 |
| 6,007,934 A | * | 12/1999 | Auer et al. ................... 429/44 |
| 6,040,077 A | | 3/2000 | Debe et al. ................... 429/40 |
| 6,146,782 A | * | 11/2000 | Wendt et al. ................. 429/40 |
| 6,165,636 A | * | 12/2000 | Giallombardo et al. ....... 429/44 |
| 6,297,185 B1 | * | 10/2001 | Thompson et al. ......... 501/101 |
| 6,370,834 B1 | * | 4/2002 | Giallombardo et al. ....... 429/44 |

OTHER PUBLICATIONS

A. Ma, Y. Leng, A. Huangh, X. Liao, and Y. Shi; "Performance of a New Electrocatalyst For PEMFC"; *Extended Abstracts of the Third International Symposium on New Materials For Electrochemical Systems,* Jul. 1999, pp. 80–81. XP–002168085.

G. Lalande, M.C. Denis, P. Gouérec, D. Guay, J. P. Dodelet, and R. Schulz; "Pt–Based Nanocomposites Produced By High Energy Ball Milling As Electrocatalysts In Polymer Electrolyte Fuel Cells", *Journal of New Materials For Electrochemical Systems,* vol. 3, No. 3, Jul. 2000, pp. 185–192. XP001004610.

K. Y. Chen, P. K. Shen, and A. C. C. Tseung; "Anodic Oxidation Of Impure H2 On Teflon–Bonded PT–Ru–$WO_3$/C Electrodes," vol. 142, No. 10, Oct. 1995, pp. 1185–1187, XP002168086.

M. Götz and H. Wendt; "Binary and Ternary Anode Catalyst Formulations Including The Elements W, Sn and Mo for PEMFCs Operated On Methanol Or Reformate Gas", *Electrochimica Acta,* GB, Elsevier Science Publishers, Barking, vol. 43, No. 24, Aug. 21, 1998, pp. 3637–3644, XP004132402.

* cited by examiner

SUBOXIDE FUEL CELL CATALYST FOR ENHANCED REFORMATE TOLERANCE

This application claims the benefit of U.S. Provisional Application No. 60/173,444, filed Dec. 29, 1999.

FIELD OF THE INVENTION

This invention relates to fuel cell electrode catalysts comprising alternating platinum-containing layers and layers containing suboxides of a second metal that display an early onset of CO oxidation. Preferably the early onset is manifest as a pre-peak, in addition to the normal Pt CO oxidation peak, in CO oxidation cyclic voltametry. Methods of manufacturing the subject catalysts are also provided. The fuel cell catalysts of the present invention show improved reformate tolerance, and in particular improved CO tolerance.

BACKGROUND OF THE INVENTION

The fuel stream feeding a hydrogen fuel cell may be supplied by reformation of hydrocarbons. However, the reformate stream will typically contain constituents including CO, $CO_2$, $N_2$ and $CH_3$ in addition to hydrogen. Typical fuel cell catalysts are susceptible to carbon monoxide poisoning, which causes significant loss of power and durability. U.S. Pat No. 4,910,099 discloses one method of improving CO tolerance in fuel cells. In this method, $O_2$ or air is "bled" to the anode side of the cell, where it reacts with any CO present in the fuel gas stream to form $CO_2$. However, this method reduces cell efficiency.

U.S. Pat. No. 5,183,713 concerns a fuel cell catalyst with improved CO tolerance comprised of platinum alloyed with 2–10% tantalum. The metals are not alternately layered and suboxides are not taught.

U.S. Pat. No. 5,523,177 concerns a direct-methanol fuel cell including a partially reduced metal oxide anode porous electrode having an oxide content of between 5 wt % and 20 wt %. The exemplary catalyst is composed of an alloy of platinum and ruthenium. This reference does not teach an alternately layered catalyst. The reference indicates that "partial reduction" proceeds by reduction of $PtO_x$, without significant reduction of $RuO_x$. (U.S. Pat. No. 5,523,177 at col. 4, ln. 62-col. 5, ln. 4). In addition, the reference teaches that reduction of $RuO_x$ is not desirable. (Id.) The reference does not teach that the catalyst disclosed therein has any favorable CO tolerance characteristics in a hydrogen/air or reformate/air fuel cell.

U.S. Pat. No. 6,040,077 concerns an alternately layered catalyst of Pt and Ru, including Pt and Ru oxides and suboxides.

A seminal review of anode catalyst materials for CO oxidation (Ross, "The Science of Electrocatalysis on Biometallic Surfaces", Lawerence Berkeley National Laboratories Report, LBNL-40486) cites the following important criteria for the selection of catalyst materials: the material has to be a Pt alloy, the material alloyed to Pt must not be an oxide or readily form an oxide.

SUMMARY OF THE INVENTION

Briefly, the present invention provides fuel cell electrode catalysts comprising alternating platinum-containing layers and layers containing suboxides of a second metal, where the catalyst demonstrates an early onset of CO oxidation. Preferably the early onset appears as a shoulder in CO oxidation cyclic voltametry and more preferably as a pre-peak.

In another aspect, the present invention provides fuel cell electrode catalysts comprising alternating platinum-containing layers and layers containing suboxides of a second metal selected from the group consisting of Group IIIb metals, Group IVb metals, Group Vb metals, Group VIb metals and Group VIIb metals. Preferably the second metal is selected from the group consisting of Ti, Ta, W and Mo.

In another aspect, the present invention provides methods of making such catalysts. In particular, the present invention provides methods of making such catalysts by alternate deposition of platinum and second metals in the presence of substoichiometric amounts of gaseous oxygen.

What has not been described in the art, and is provided by the present invention, is a CO tolerant fuel cell catalyst of the present composition or the method of it's manufacture provided herein.

In this application:

"suboxide" means a composition $MO_x$ of a metal M having one or more chemical oxidation states $MO_n$ where n is one or more positive rational numbers (typically a ratio of small positive integers), wherein x is not equal to any n and wherein x is less than the greatest n; and "substituted" means substituted by conventional substituents which do not interfere with the desired product, e.g., substituents can be alkyl, alkoxy, aryl, phenyl, halo (F, Cl, Br, I), cyano, nitro, etc.

"peak" means a local maximum value;

a "pre-peak", means, in regard to CO oxidation cyclic voltametry, a peak in addition to and appearing at a lower potential than a Pt CO oxidation peak;

"shoulder" means a local maximum in the first derivative of a value;

"early onset of CO oxidation" means CO oxidation occurring at a potential lower than that of the Pt CO oxidation peak. The Pt CO oxidation peak typically occurs at around 400 mV, referenced to a saturated calomel electrode, but may be shifted as low as 200 mV by the presence of other metals, e.g. Ru. Early onset of CO oxidation may be demonstrated by CO oxidation cyclic voltametry, where it is indicated by a rise in current reflecting the oxidation of CO. Preferable conditions for performing cyclic voltametry are 80° C. temperature, ambient pressure and 25 mV/sec scan rate. More specifically, early onset may be demonstrated by comparison of the subject CO oxidation cyclic voltametry curve to a curve obtained for a Pt catalyst. The y-axis of the subject curve (representing electrical current) is normalized to the Pt curve by multiplying the values of the subject curve by a scaling factor such that the two curves have the same value at the Pt oxide reduction peak (label (1) in FIG. 3). The curves are not normalized in the x-axis (representing electrical potential). "Early onset" is defined with regard to the region of the subject curve between the point of $H_2$ evolution and a point 140 millivolts more positive than the reference electrode (saturated calomel electrode (SCE)), preferably in the region between $H_2$ evolution and 110 millivolts above SCE, more preferably in the region between $H_2$ evolution and 80 millivolts above SCE, and most preferably in the region between $H_2$ evolution and 50 millivolts above SCE. "Early onset" is seen where a point in that region of the subject curve has a positive slope or, more preferably, demonstrates at least 10% greater capacitive (double layer) current than the Pt curve.

It is an advantage of the present invention to provide fuel cell catalysts demonstrating improved CO tolerance.

DETAILED DESCRIPTION OF PREFERRED EMBODIMENTS

The present invention provides fuel cell catalysts, preferably anode catalysts, comprising alternating platinum-containing layers and layers containing suboxides of a second metal. It has been discovered that such catalysts provide improved CO tolerance in fuel cell use by their improved ability to oxidize CO at lower potentials.

The platinum-containing layers of the present invention contain 1–100 atom % platinum, but preferably 50–100 atom %. The platinum may also be present as an suboxide. This layer may also contain 0–30 atom % oxygen, but preferably 2–10 atom %.

The suboxide-containing layers contain oxygen and at least one second metal M. Preferred metals include selected from the group consisting of Group IIIb metals, Group IVb metals, Group Vb metals, Group VIb metals and Group VIIb metals. More preferred metals include Ti, Ta, W and Mo.

The atomic ratio x of oxygen to M is not equal to that in any stoichiometric oxidation state n of M. Preferably x varies from any n by 2% or more, more preferably by 5% or more, and more preferably by 10% or more. In addition, x is less than the highest ratio of O to M in a chemical oxidation state of M. Preferably x is between 0.1 and 5.0.

Figure 2:
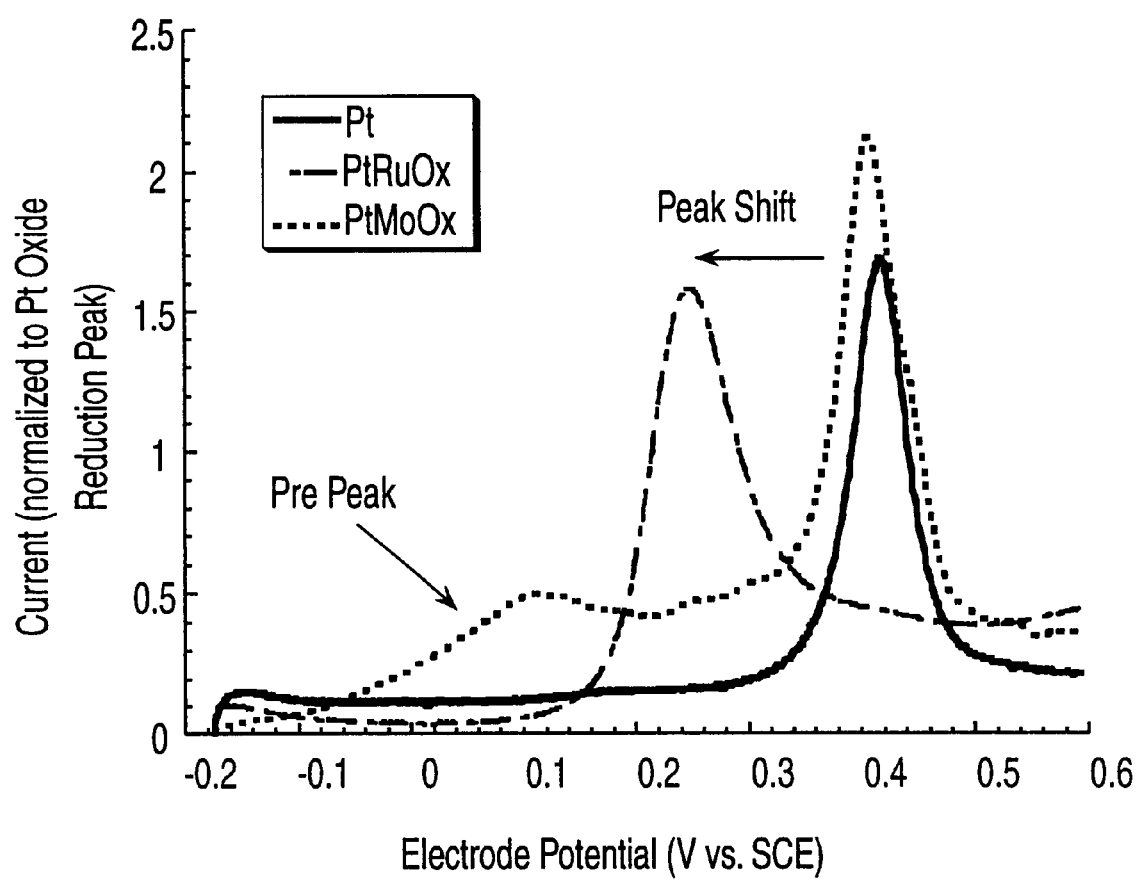
FIG. 2 is a graph demonstrating CO oxidation cyclic voltametric scans of two comparative catalysts, Pt and PtRuO$_X$, and one catalyst according to the present invention, PtMoO$_X$. The PtRuO$_X$ and PtMoO$_X$ scans are normalized to the Pt scan for comparison.

In addition, a catalyst can be made that combines a variety of layers. In one preferred embodiment, PtMO$_X$ and PtRu catalysts are combined by alternate deposition. Preferably the layers of the second catalyst material, MO$_X$, and Ru-containing layers are not adjacent but are interleaved with layers of Pt-containing catalyst material, e.g. where the repeating unit of layers is Pt:MO$_X$:Pt:Ru. Such a catalyst may take advantage of both the early onset of CO oxidation according to the present invention and the shift of the Pt CO oxidation peak observed in the PtRuO$_X$ catalyst, as can be seen in FIG. 2.

The catalysts of the present invention comprising at least one platinum-containing layer and one suboxide-containing layer, but preferably contain at least 30 of each layer and more preferably more than 60 alternating layers of each kind. It is understood that in some cases interstitial layers may be generated between the Pt and suboxide layers, which may contain alloys of materials found in the two principal layer types.

The total loading of catalyst material, including Pt, M and O, is preferably at least 0.01 mg/cm$^2$, and more preferably at least 0.1 mg/cm$^2$. The total loading of catalyst material is preferably not more than 1 mg/cm$^2$. CO tolerance and onset potential of CO oxidation tend to increase with loading.

The catalysts of the present invention can be made by any appropriate method. Preferably, the catalyst is made by alternating layer deposition of at least two different types of materials. Deposition techniques include sputter deposition, vapor deposition, cathodic arc deposition, laser ablation, wet chemical methods including electrochemical methods, chemical vapor deposition, combustion vapor deposition and JVD™.

One preferred method is sputter deposition. Deposition of the suboxide layers is accomplished by deposition of the selected metal in the presence of substoichiometric amounts of oxygen used as a sputtering gas, preferably in mixture with argon. The manufacture of catalyst is preferably preceded by determination of what Ar/O ratio determines what oxide form of the material that is to be deposited with Pt. In reactive sputtering a material's target potential is a function of the oxide state of the target's surface when operated in a constant power mode. In the alternative, a metal oxide target might by used in argon without oxygen gas by using an RF power supply.

The catalysts of the present invention can be used to manufacture membrane electrode assemblies (MEA's) incorporated in electrochemical cells such as are described in U.S. Pat. Nos. 5,879,827 and 5,879,828, the teachings of which are incorporated herein by reference. Preferably, the catalysts of the present invention are used in hydrogen fuel cells.

The catalysts of the present invention may be used as anode or cathode electrodes but preferably anode electrodes. The catalysts of the present invention may be used in fuel cells which operate on any electrooxidizable fuels such as hydrogen, alcohols, including methanol and ethanol, ketones, aldehydes, ethers, ammonia, hydrazine, and the like. Preferred fuel cells operate on hydrogen or methanol fuel and most preferably hydrogen.

This invention is useful in fuel cells, particularly where CO tolerance is advantageous or required.

Objects and advantages of this invention are further illustrated by the following examples, but the particular materials and amounts thereof recited in these examples, as well as other conditions and details, should not be construed to unduly limit this invention.

EXAMPLES

In the following examples, the microstructures employed as catalyst supports were made according to the process described in U.S. Pat. No. 5,338,430, the teachings of which are incorporated herein by reference. Nanostructured perylene red (PR 149, American Hoechst Corp., Somerset, N.J.) films on polyimide substrates were made using the techniques described in U.S. Pat. Nos. 4,812,352 and 5,039,561 by thermal evaporation and vacuum annealing of the organic pigment C.I. Pigment Red 149, i.e., N,N'-di(3,5-xylyl)perylene-3,4:9,10-bis(dicarboximide). After deposition and annealing, highly oriented crystal structures were formed with large aspect ratios, controllable lengths of about 0.5 to 2 micrometers, widths of about 0.03–0.05 micrometer and areal number density of approximately 30 whiskers per square micrometer, oriented substantially normal to the polyimide substrate. These microstructures are nonconductive and separate readily from the polyimide substrate when pressed into ion conducting membrane material such as Nafion™ (DuPont Chemicals, Wilmington, Del., available from ElectroChem, Inc., Woburn, Mass., and Aldrich Chemical Co., Inc., Milwaukee, Wis.).

Figure 1:
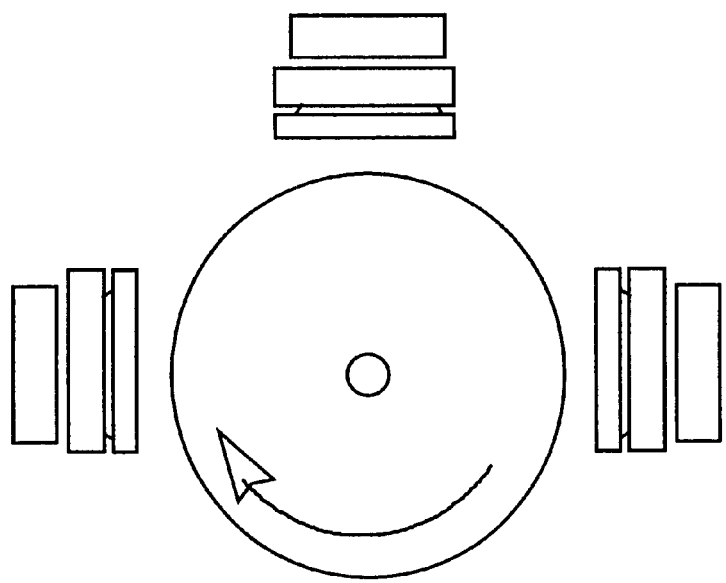
FIG. 1 is a schematic depiction of an apparatus for practice of the method of the present invention.

In the following examples, catalyst metal coatings were applied either to the PR 149 support described above, to an optically flat polyimide witness slide, and/or to a glassy carbon substrate with the PR 149 support on it, by sputter deposition, using a vacuum system schematically depicted in FIG. 1. The apparatus consisted of a three-source magnetron sputtering system arranged around the outer circumference of a cylindrical chamber containing a 38 cm (15 inch) diameter rotating drum. The substrates were mounted on the drum and rotated sequentially past positions in front of the sputtering sources at rates of between 1 and 8 rpm. The sources were shielded such that the sample could not be coated from any two fluxes at the same time. The vacuum pump used was a Varian AV8 cryopump (Varian Associates, Inc., Lexington, Mass.) equipped with an Alactel 2012A rotary vane roughing pump (Alactel Vacuum Products, Hingham, Mass.). The cryopump was partially isolated from the chamber by a butterfly valve. During deposition, pressure was maintained at 0.28 Pa (2.1 millitorr) as the sputtering gas flow rate was controlled by MKS flow controllers (MKS Instruments, Inc., Andover, Mass.). The sputtering gases used were either argon or an argon/oxygen mix. Control of oxygen stoichiometry was achieved by varying the argon/oxygen flow ratio. The oxygen stoichiometry could be also monitored by the measurement of the target potential that is run with a fixed power. Target potential is a function of the argon/oxygen flow ratio. Three inch targets (Target Materials, Inc., Columbus, Ohio) were used, consisting of 0.76 cm (0.3 inches) of target material bonded with indium to a copper backing. An Advanced Energy MDX 500 power supply (Advanced Energy Industries, Inc., Fort Collins, Colo.) was used in the constant power mode for each deposition. For the last two rotations, only the Pt target was active, so as to provide a Pt-rich surface.

Measurement of catalyst loading was done by a simple gravimetric method after deposition. A sample of the polyimide-supported nanostructured film layer was massed using a digital balance accurate to about one microgram. Then the nanostructured layer was wiped off the polyimide substrate using a paper tissue or linen cloth, and the substrate was remassed. Because a preferred property of the nanostructured catalyst support is that it transfers easily and completely to the ion exchange membrane, it also was easily removed by simple wiping with a cloth. The mass per unit area of the catalyst support particles, without Pt, was also measured this way. Nanostructures for use in the anode (the hydrogen reaction side of the fuel cell) were made as indicated in each example, below. Nanostructures for use in the cathode (the oxygen reaction side of the fuel cell) were made by deposition of Pt on PR 149 nanostructures using argon sputtering gas. The catalyst loading was 0.21 mg/cm$^2$.

Some PR 149 supported catalysts were fabricated into membrane electrode assemblies (MEA's) for testing in a fuel cell as described below. The MEA's were made from the supported catalyst, an ion conducting membrane (ICM) and electrode backing material as follows.

The ion conducting membranes used were perfluorinated sulfonic acid materials, specifically, Nafion™ 117 membranes (DuPont Chemicals, Wilmington, Del., available from ElectroChem, Inc., Woburn, Mass., and Aldrich Chemical Co., Inc., Milwaukee, Wis.).

Before use, the Nafion membrane was pretreated by sequentially immersing into a) boiling water for one hour, b) boiling 3% $H_2O_2$ for one hour, c) boiling ultra pure $H_2O$ for 1 hour, d) boiling 0.5 M $H_2SO_4$ for one hour, e) boiling ultra pure DI $H_2O$ for one hour. The Nafion was then stored in ultrapure DI water until use. Prior to forming an MEA the Nafion was dried by laying it between several layers of clean linen cloth at 30° C. for 10–20 minutes.

Each MEA was made using a static pressing procedure which consisted of transfer of the catalyst-coated nanostructured elements into the Nafion 117 membrane by pressing under vacuum at 130° C. and a pressure of 160 MPa (11.6 tons per square inch). For preparation of an MEA with 5 cm$^2$ of active area by a static pressing method, two 5 cm$^2$ square pieces of the nanostructured elements on a polyimide substrate—one for the anode, one for the cathode—were placed on either side of the center of a 7.6 cm×7.6 cm Nafion 117 membrane. A 50 micrometer thick, 7.6 cm×7.6 cm sheet of polyimide was placed on each side of the catalyst coated substrate/Nafion/catalyst coated substrate sandwich. This assembly was then placed between two steel shim plates and pressed under a low grade vacuum at 130° C. and a pressure of 160 MPa (11.6 tons per square inch) using a Carver lab press (Carver Inc., Wabash, Ind.). A low grade vacuum (less than about 2 Torr) was applied to partially remove air from the stack just prior to applying the maximum pressure. The original 5 cm$^2$ polyimide substrates were then peeled away leaving the catalyst attached to the surface of the Nafion membrane.

Both catalyst electrodes of the MEA were covered with 0.4 cm (0.015") thick ELAT™ electrode backing material (E-tek, Inc., Natick, Mass.), and centered in a 5 cm$^2$ square hole, cut to match the catalyst area, of a 250 micrometers thick Teflon™ coated fiberglass gasket (The Furon Co., CHR Division, New Haven, Conn.). The Elat electrode backing material is designated as carbon only, i.e., it contains no catalyst.

Bulk composition was determined by the use of energy dispersive analytical fluoresence (EDAX) methods. Measurements were done using an Amway scanning electron microscope with a silicon based x-ray detector array using Tracor Northern counting electronics and software. Samples used came from deposition on a witness slide or from whiskers removed from the substrate using dental adhesive. The electron beam of the scanning electron microscope produces x-rays when it strikes the samples. The energy of the x-rays is dependent on the atomic electronic structure of the material it strikes. Data was taken for x-ray energies between 0 and 10 keV over a 100 seconds interval at a fixed beam current. Fitting the data, subtracting the background, a ratio of Pt-La peak (2.051 eV) and the Ru-La peak (2.558 eV) gives the atomic ratio of the bulk material.

Surface stoichiometry of a catalyst deposition was determined by X-ray Photoelectron Spectroscopy (XPS), using a Hewlett-Packard Model 5950A ESCA system (Hewlett-Packard Co., Palo Alto, Calif.) equipped with an Al $K_\alpha$ monochromator. XPS is a non-damaging method of determining the elemental composition of the surface of materials based on measuring the kinetic energy of photoemitted electrons from atomic core levels through soft x-ray excitation. Emitted electrons can be detected at various angles relative to the sample surface; those detected at angles approaching 0° indicate elemental composition closest to, e.g., approximately the first 5 Å of, the surface. Samples used came from deposition on a witness slide.

The MEA was then mounted in a test cell station (Fuel Cell Technologies, Inc., Albuquerque, N. Mex.). The test station includes a variable electronic load with separate anode and cathode gas handling systems to control gas flow, pressure and humidity. The electronic load and gas flow are computer controlled.

Fuel cell polarization curves were obtained the under the following test parameters: electrode area, 5 cm$^2$; cell temperature, 75° C., anode gas pressure (gauge), 62.0 kPa (9 psig); anode gas flow rate, 40–150 standard cc/min; anode humidification temperature, 105° C.; cathode gas pressure (gauge), 414 kPa (60 psig); cathode flow rate, 600 standard cc/min; cathode humidification temperature, 65° C. Humidification of the gas streams was provided by passing the gas through sparge bottles maintained at the stated temperatures.

Each fuel cell was brought to operating conditions at 75° C. under hydrogen and oxygen flows. Test protocols were initiated after 24 hours of operation and the following variables were measured: anode pressure, anode flow, cathode pressure, cathode flow, cell temperature and CO concentration. The H2 and CO gas mixture came in commercially available premixed tanks (Oxygen Services, St. Paul, Minn.). The tanks came with a certificate of analysis. For method of comparison, the change in current as measured in a potentiodynamic scan at 700 mV between operation from $H_2$ and operation under a CO challenge is taken as the metric for determination of CO tolerance. The reason for 700 mV as the metric is that lies somewhat between the kinetic and the mass transport regions of the polarization curve. As such it is less susceptible, to other artifacts in the MEA that might more adversely effect other regions of the curve.

CO oxidation cyclic voltammetry (CV) in the form of CO stripping was performed in order to determine the ability of the catalyst materials to oxidize CO. In the practice of the method herein, the catalyst-coated naonostructured whiskers were grown as described above except that a GC glassy carbon electrode (Tokai Carbon, Japan) was substituted for the polyimide substrate. The glassy carbon electrodes were tested in 1.0 M $H_2SO_4$ solution, which was chosen as the electrolyte solution in order to more closely mimic the environment of the perfluorosulfonic acid based proton exchange membranes. Tests were conducted at 80° C. temperature and atmospheric pressure. The potentiostat used for these experiments was a Solartron 1280B (Solartron Ltd., UK). The setup consisted of the standard 3-electrode cell configuration using a working electrode with an area of 0.95 $cm^2$. The reference electrode for measurement of potentials was a saturated calomel electrode (SCE). In the experimental procedure, the cell was first purged with $N_2$ for 15 minutes to remove any oxygen. CO gas was then applied for 15 minutes to poison the catalyst surface. The CO gas was then replaced with nitrogen and the potentistat was used to apply a potential sweep and measure the current. The voltage sweep rate was 25 mV/sec.

FIG. 2 demonstrates CO oxidation cyclic voltametry curves observed for Pt, $PtRuO_X$, and $PtMoO_X$ catalysts. The $PtRuO_X$ and $PtMoO_X$ curves were normalized to the Pt curve by multiplying the values of the subject curve by a scaling factor such that the curves have the same value at the Pt oxide reduction peak (not appearing in this Figure).

Figure 3:
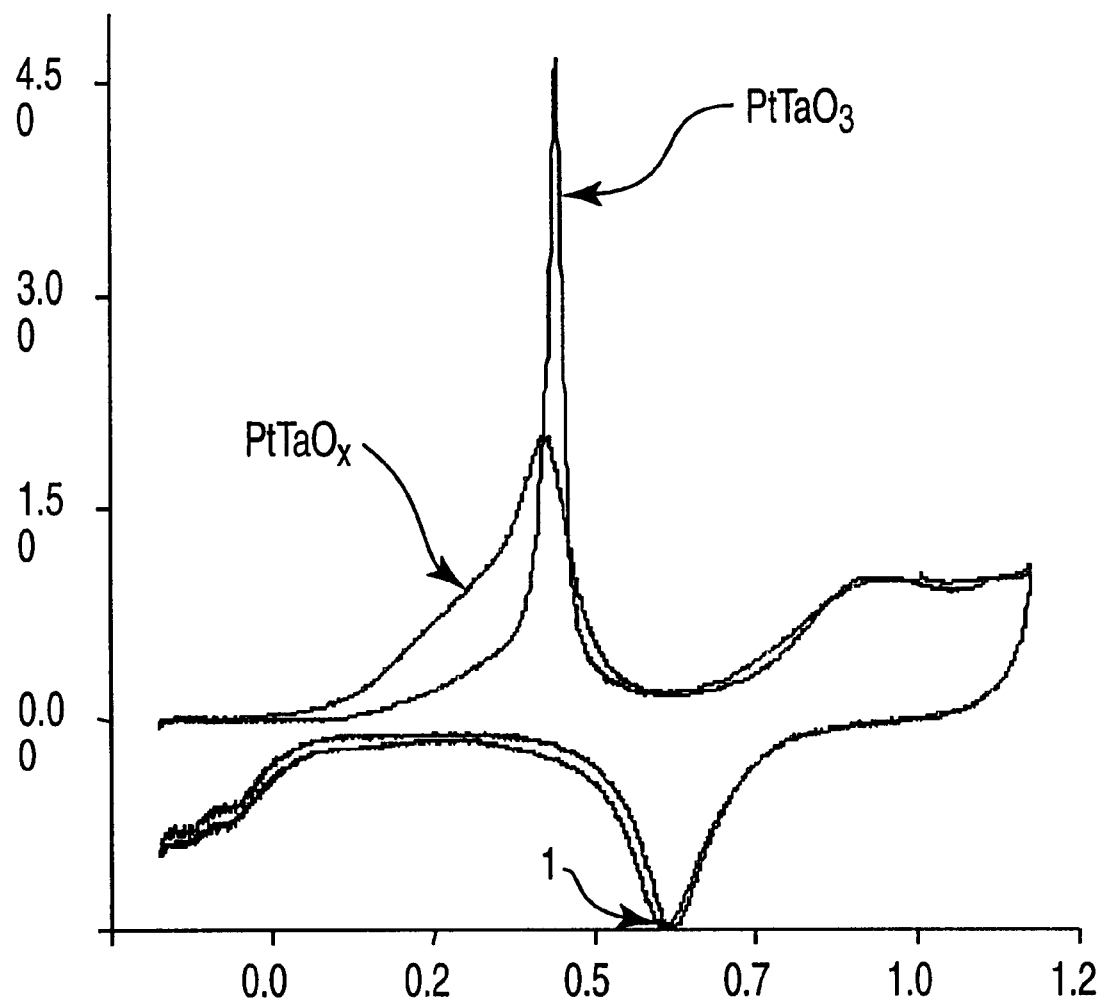
FIG. 3 is a graph demonstrating CO oxidation cyclic voltammetric scans of a comparative catalyst, PtTa$_2$O$_5$, and a catalyst according to the present invention, PtTaO$_X$. The PtTaO$_X$ and PtTa$_2$O$_5$ scans were normalized to the same Pt oxide reduction peak (1).

FIG. 3 demonstrates CO oxidation cyclic voltametry curves observed for $PtTaO_X$ and $PtTa_2O_5$ catalysts. The $PtTaO_X$ and $PtTa_2O_5$ scans were normalized, as described above.

In FIG. 2, the $PtMoO_X$ catalyst according to the present invention demonstrates early onset of CO oxidation, appearing as a distinct pre-peak in the CV curve. By comparison, the CV curves for the comparative Pt and $PtRuO_X$ catalysts are flat, having a slope of zero, in the same range, and continuing until the begining of the Pt CO oxidation peak. The Pt CO oxidation peak of the comparative $PtRuO_X$ catalyst is shifted by about 150 mV from the Pt CO oxidation peak of the Pt catalyst, whereas the Pt CO oxidation peak of the $PtMoO_X$ catalyst was only slightly shifted. The $PtMoO_X$ catalyst according to the present invention provides improved CO oxidation by a distinctly different mechanism than the $PtRuO_X$ catalyst, i.e. an early onset of CO oxidation rather than a shift of the Pt CO oxidation peak.

In FIG. 3, the $PtTaO_X$ catalyst according to the present invention also demonstrates early onset of CO oxidation, appearing as a distinct shoulder in the CV curve. By comparison, the CV curves for the comparative $PtTa_2O_5$ catalyst shows a later onset of CO oxidation associated with the Pt CO oxidation peak.

EXAMPLE 1

Test catalysts for this Example consisted of Pt and Mo in a 3:1 ratio as determined by the deposition rates and confirmed by EDAX. During deposition of the catalyst metals, the Mo target power was held at 100 Watts and the target voltage was 390 volts for the PtMo catalyst, 575 volts for $Pt(MoO_x)$ catalyst, and 675 volts for $Pt(MoO_3)$ catalyst. For each sample the as deposited finishing surface had an atomic ratio of approximately Pt:Mo of 6:1 as determined by XPS.

A normalized CO oxidation cyclic voltametry trace for a $Pt(MoO_x)$ catalyst material is reported in FIG. 2.

CO oxidation measurements were performed on each sample in a fuel cell under challenge by the CO concentration indicated in Table I. Five scans were made for each measurement and the average is reported. The RMS error was less than + or − 10 mAmps/$cm^2$. Table I summarizes the results for this measurement.

TABLE I

| CO Concentration | Change in Current @ 700 mV (mAmps/$cm^2$) from $H_2$ polarization Curve | | |
|---|---|---|---|
| (PPM) | PtMo | Pt($MoO_x$) | Pt($MoO_3$) |
| 55 | −57 | −10 | −310 |
| 100 | −163 | −25 | Not tested |

EXAMPLE 2

Test catalysts for this Example consisted of Pt and Ti in a 3:1 ratio as determined by deposition rates. The Ti target power was held at 100 Watts and the target voltage was 414 volts for PtTi, 434 volts for Pt($TiO_x$), and 474 volts for Pt($TiO_2$). For each sample the as deposited finishing surface had an atomic ratio of approximately Pt:Ti of 6:1 as determined by XPS.

CO oxidation measurements were performed on each sample in a fuel cell under challenge by the CO concentration indicated in Table II. Five scans were made for each measurement and the average is reported. The RMS error was less than + or − 10 mAmps/$cm_2$. Table II summarizes the results for this measurement.

TABLE II

| CO Concentration | Change in Current @ 700 mV (mAmps/$cm^2$) from $H_2$ polarization Curve | | |
|---|---|---|---|
| (PPM) | PtTi | Pt($TiO_x$) | Pt($TiO_2$) |
| 48 | −298 | −56 | −60 |
| 100 | Not tested | −149 | −250 |

EXAMPLE 3

In each of the cases listed below the atomic ratio of Pt to Ta was 2:1 as determined by deposition rates. The Ta target power was held at 100 Watts and the target voltage was 390 volts for PtTa, 435 volts for Pt($TaO_x$), and 510 volts for $PtTa_2O_5$. For each sample the as deposited finishing surface had an atomic ratio of approximately Pt:Ta of 6:1 as determined by XPS.

Normalized CO oxidation cyclic voltametry traces for the Pt(TaO$_x$) and PtTa$_2$O$_5$ catalyst materials are reported in FIG. 3.

CO oxidation measurements were performed on each sample in a fuel cell under challenge by the CO concentration indicated in Table III. Five scans were made for each measurement and the average is reported. The RMS error was less than + or − 10 mAmps/cm$^2$. Table II summarizes the results for this measurement.

TABLE III

| CO Concentration | Change in Current @ 700 mV (mAmps/cm$^2$) from H$_2$ polarization Curve | | |
|---|---|---|---|
| (PPM) | PtTa | Pt(TaOx) | PtTa$_2$O$_5$ |
| 55 | −465 | −20 | −162 |
| 300 | Not tested | −85 | −320 |

EXAMPLE 4

Additional examples using a PtWO$_x$ suboxide catalyst material according to the present invention demonstrated an early onset of CO oxidation.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A catalyst in a fuel cell electrode, said catalyst comprising alternating layers of a first catalyst material containing Pt and a second catalyst material containing at least one suboxide of a second metal which is not Pt, wherein said catalyst demonstrates a pre-peak of CO oxidation occurring at lower potential than that of the Pt CO oxidation peak.

2. The catalyst according to claim 1 wherein said suboxide of a second metal has the formula MO$_x$, wherein second metal M has one or more stoichiometric oxidation states MO$_n$ where n is one or more positive rational numbers, wherein x is not equal to any n and x varies from any n by 5% or more.

3. The catalyst according to claim 1 wherein said pre-peak is demonstrated by CO stripping cyclic voltametry performed under conditions of 80° C., ambient pressure and 25 mV/sec scan rate.

4. The catalyst according to claim 1 wherein said second metal is selected from the group consisting of Group IIIb metals, Group IVb metals, Group Vb metals, Group VIb metals and Group VIIb metals.

5. The catalyst according to claim 1 wherein said second metal is selected from the group consisting of Ti, Ta, W and Mo.

6. The catalyst of claim 1 wherein said fuel cell electrode is a hydrogen fuel cell electrode.

7. A method of making a catalyst according to claim 1 comprising alternating layers of a first catalyst material containing Pt and a second catalyst material containing at least one suboxide of said second metal, comprising alternating steps of deposition of said first catalyst material and deposition of said second catalyst material on a substrate.

8. The method of claim 7 wherein said deposition steps comprise methods selected independently from the group consisting of sputter deposition, vapor deposition, cathodic arc deposition, laser ablation and wet chemical methods.

9. The method of claim 7 wherein said steps of deposition of said second catalyst material comprise deposition of said second metal in the presence of substoichiometric amounts of oxygen.

10. The method of claim 9 wherein said deposition steps comprise the method of sputter deposition.

11. A catalyst in a fuel cell electrode, said catalyst comprising alternating layers of a first catalyst material containing Pt and a second catalyst material containing at least one suboxide of a second metal which is not Pt, wherein said catalyst demonstrates a pre-shoulder of CO oxidation occurring at lower potential than that of the Pt CO oxidation peak.

12. The catalyst according to claim 11 wherein said suboxide of a second metal has the formula MO$_x$, wherein second metal M has one or more stoichiometric oxidation states MO$_n$ where n is one or more positive rational numbers, wherein x is not equal to any n and x varies from any n by 5% or more.

13. The catalyst according to claim 11 wherein said pre-shoulder is demonstrated by CO stripping cyclic voltametry performed under conditions of 80° C., ambient pressure and 25 mV/sec scan rate.

14. The catalyst according to claim 11 wherein said second metal is selected from the group consisting of Group IIIb metals, Group IVb metals, Group Vb metals, Group VIb metals and Group VIIb metals.

15. The catalyst according to claim 11 wherein said second metal is selected from the group consisting of Ti, Ta, W and Mo.

16. The catalyst of claim 11 wherein said fuel cell electrode is a hydrogen fuel cell electrode.

17. A method of making a catalyst according to claim 11 comprising alternating layers of a first catalyst material containing Pt and a second catalyst material containing at least one suboxide of said second metal, comprising alternating steps of deposition of said first catalyst material and deposition of said second catalyst material on a substrate.

18. The method of claim 17 wherein said deposition steps comprise methods selected independently from the group consisting of sputter deposition, vapor deposition, cathodic arc deposition, laser ablation and wet chemical methods.

19. The method of claim 17 wherein said steps of deposition of said second catalyst material comprise deposition of said second metal in the presence of substoichiometric amounts of oxygen.

20. The method of claim 19 wherein said deposition steps comprise the method of sputter deposition.

21. A catalyst in a fuel cell electrode, said catalyst comprising alternating layers of a first catalyst material containing Pt and a second catalyst material containing at least one suboxide of a second metal which is not Pt, wherein said catalyst demonstrates an early onset of CO oxidation.

22. The catalyst according to claim 21 wherein said suboxide of a second metal has the formula MO$_x$, wherein second metal M has one or more stoichiometric oxidation states MO$_n$ where n is one or more positive rational numbers, wherein x is not equal to any n and x varies from any n by 5% or more.

23. The catalyst according to claim 21 wherein said early onset is demonstrated by CO stripping cyclic voltametry performed under conditions of 80° C., ambient pressure and 25 mV/sec scan rate.

24. The catalyst according to claim 23 wherein said early onset is demonstrated by a positive slope of the voltametry curve in the region between the point of $H_2$ evolution and a point 140 millivolts more positive than the reference electrode (saturated calomel electrode (SCE)).

25. The catalyst according to claim 23 wherein said early onset is demonstrated by a positive slope of the voltametry curve in the region between the point of $H_2$ evolution and a point 110 millivolts more positive than the reference electrode (saturated calomel electrode (SCE)).

26. The catalyst according to claim 23 wherein said early onset is demonstrated by a positive slope of the voltametry curve in the region between the point of $H_2$ evolution and a point 80 millivolts more positive than the reference electrode (saturated calomel electrode (SCE)).

27. The catalyst according to claim 23 wherein said early onset is demonstrated by a positive slope of the voltametry curve in the region between the point of $H_2$ evolution and a point 50 millivolts more positive than the reference electrode (saturated calomel electrode (SCE)).

28. The catalyst according to claim 21 wherein said second metal is selected from the group consisting of Group IIIb metals, Group IVb metals, Group Vb metals, Group VIb metals and Group VIIb metals.

29. The catalyst according to claim 21 wherein said second metal is selected from the group consisting of Ti, Ta, W and Mo.

30. The catalyst of claim 21 wherein said fuel cell electrode is a hydrogen fuel cell electrode.

31. A method of making a catalyst according to claim 21 comprising alternating layers of a first catalyst material containing Pt and a second catalyst material containing at least one suboxide of said second metal, comprising alternating steps of deposition of said first catalyst material and deposition of said second catalyst material on a substrate.

32. The method of claim 31 wherein said deposition steps comprise methods selected independently from the group consisting of sputter deposition, vapor deposition, cathodic arc deposition, laser ablation and wet chemical methods.

33. The method of claim 31 wherein said steps of deposition of said second catalyst material comprise deposition of said second metal in the presence of substoichiometric amounts of oxygen.

34. The method of claim 33 wherein said deposition steps comprise the method of sputter deposition.

35. A catalyst in a fuel cell electrode, said catalyst comprising alternating layers of a first catalyst material containing Pt and a second catalyst material containing at least one suboxide of a second metal selected from the group consisting of Group IIIb metals, Group IVb metals, Group Vb metals, Group VIb metals and Group VIIb metals.

36. The catalyst according to claim 35 wherein said suboxide of a second metal has the formula $MO_x$, wherein second metal M has one or more stoichiometric oxidation states $MO_n$ where n is one or more positive rational numbers, wherein x is not equal to any n and x varies from any n by 5% or more.

37. The catalyst according to claim 35 wherein said second metal is selected from the group consisting of Ti, Ta, W and Mo.

38. The catalyst of claim 35 wherein said fuel cell electrode is a hydrogen fuel cell electrode.

39. A method of making a catalyst according to claim 35 comprising alternating layers of a first catalyst material containing Pt and a second catalyst material containing at least one suboxide of said second metal, comprising alternating steps of deposition of said first catalyst material and deposition of said second catalyst material on a substrate.

40. The method of claim 39 wherein said deposition steps comprise methods selected independently from the group consisting of sputter deposition, vapor deposition, cathodic arc deposition, laser ablation and wet chemical methods.

41. The method of claim 39 wherein said steps of deposition of said second catalyst material comprise deposition of said second metal in the presence of substoichiometric amounts of oxygen.

42. The method of claim 41 wherein said deposition steps comprise the method of sputter deposition.

43. A catalyst in a fuel cell electrode, said catalyst comprising alternating layers of a first catalyst material containing Pt a second catalyst material containing at least one suboxide of a second metal selected from the group consisting of Group IIIb metals, Group IVb metals, Group Vb metals, Group VIb metals and Group VIIb metals, and a third catalyst material containing Ru.

44. The catalyst according to claim 43 wherein said second metal is selected from the group consisting of Ti, Ta, W and Mo.

45. The catalyst according to claim 43 wherein layers of said second catalyst material and said third catalyst material are not adjacent but are interleaved with layers of said first catalyst material.

* * * * *